United States Patent [19]
Wagner

[11] Patent Number: 5,449,322
[45] Date of Patent: Sep. 12, 1995

[54] TORSIONAL VIBRATION DAMPER

[75] Inventor: Bernd Wagner, Düsseldorf, Germany

[73] Assignee: Paguag GmbH & Co., Dusseldorf, Germany

[21] Appl. No.: 969,310

[22] PCT Filed: Aug. 16, 1991

[86] PCT No.: PCT/DE91/00635
§ 371 Date: Feb. 16, 1993
§ 102(e) Date: Feb. 16, 1993

[87] PCT Pub. No.: WO92/03669
PCT Pub. Date: Mar. 5, 1992

[30] Foreign Application Priority Data
Aug. 16, 1990 [DE] Germany .................. 40 25 848.3

[51] Int. Cl.⁶ .................. F16F 15/12; F16F 15/30
[52] U.S. Cl. .................................................. 464/90
[58] Field of Search ............ 464/90, 180; 74/574; 474/94

[56] References Cited

U.S. PATENT DOCUMENTS

| | | | |
|---|---|---|---|
| 2,594,555 | 4/1952 | Hardy | 74/574 |
| 3,075,405 | 1/1963 | Krebs | 74/574 |
| 3,126,760 | 3/1964 | Peirce | 74/574 |
| 3,314,304 | 4/1967 | Katzenberger et al. | 74/574 |
| 3,606,802 | 9/1971 | Tsunoda | 74/574 |
| 3,670,593 | 6/1972 | Troyer | 74/574 |
| 4,083,265 | 4/1978 | Bremer, Jr. | 74/574 |
| 4,220,056 | 9/1980 | Bremer, Jr. | 74/574 |
| 4,224,835 | 9/1980 | Bauer | 74/574 |
| 4,710,152 | 12/1987 | Ichikawa et al. | 74/574 X |
| 4,781,659 | 11/1988 | Gebhardt | 74/574 X |
| 4,794,816 | 1/1989 | Serizawa et al. | 74/574 |
| 4,882,994 | 11/1989 | Vohl | 74/574 |
| 5,024,120 | 6/1991 | Andra | 74/572 X |
| 5,036,726 | 8/1991 | Wolfetal | 74/574 |

FOREIGN PATENT DOCUMENTS

| | | | |
|---|---|---|---|
| 7604193 | 10/1977 | Germany . | |
| 4018596 | 12/1991 | Germany | 464/91 |
| 58-68531 | 4/1983 | Japan | 474/94 |
| 1-35143 | 2/1989 | Japan | 474/94 |

OTHER PUBLICATIONS

Kazumi Tasaka, "Manufacture of Damper Pulley", Patent Abstracts of Japan, vol. 12, No. 73, Mar. 8, 1988.
Nobuyki Kobayshi, "Torsional Damper", Patent Abstracts of Japan vol. 7, no. 269, Nov. 30, 1983.

Primary Examiner—Daniel P. Stodola
Attorney, Agent, or Firm—Browdy and Neimark

[57] ABSTRACT

Torsional vibration dampers for piston engines, particularly for motor vehicle engines, are mounted on the crankshaft of the engine in a torsionally resistant manner. The hub (2) bears a first flyring (3) which concentrically surrounds the hub and is connected to the outer surface of the hub (2) via a rubber spring device (5) acting in the peripheral direction. Furthermore, a second flyring is provided which is secured to the hub (2) via a rubber spring device (8), again acting in the peripheral direction. To allow a torsional vibration damper of this kind to damp all vibrations generated by the engine using simple means, the rubber spring device (5) bearing the first flyring (3) is rigid while the rubber spring device (8) of the second flyring (4), which is located radially outside the first flyring (3), is flexible. The outer flyring (4), which has a greater mass moment of inertia than the inner flyring (3), can be connected in parallel or in series with the inner flyring (3) via its rubber spring device (8).

21 Claims, 2 Drawing Sheets

TORSIONAL VIBRATION DAMPER

BACKGROUND OF THE INVENTION

1. Technical Field

The invention relates to a torsional vibration damper for piston engines, particularly for motor vehicle engines, with a hub which can be mounted in a torsionally resistant manner on the crankshaft of the engine, a first flyring which concentrically surrounds the hub and is connected to the outer surface of the hub via a rubber spring device acting in the peripheral direction, as well as a second flyring which is directly or indirectly secured to the hub via a rubber spring device, again acting in the peripheral direction.

2. Prior Art

Known torsional vibration dampers of the aforementioned type, which are mounted directly on the output end of the crankshaft, serve to absorb the engine vibrations induced by forces of inertia. These engine vibrations induced by forces of inertia are in the range of approximately 150 Hz to 650 Hz, depending on design.

In order to cover this entire range, several flyrings capable of motion relative to each other are combined. In a known torsional vibration damper of the aforementioned type (DE-OS 36 08 420), for example, smaller flyrings, mounted in bearings inside the hub, are connected to the main flyring via rubber spring devices.

In known systems, the low-frequency vibrations induced by gas forces, which are in the region of about 40 Hz to 100 Hz, are damped by additional torsional vibration dampers attached to the end of the propeller shaft.

In another known vibration damper (U.S. Pat. No. 3,670,593) the inner flyring is fixed at the hub and the outer flyring is connected with the inner flyring by an additional rubber spring. The rubber springs can be varied in their length and in their properties for the respective task. This known construction only works in a good way if the outer flyring has an essentially lower mass in respect to the inner flyring because otherwise the system can become unstable. Therefore the known vibration damper is very inflexible in respect to the frequencies to be covered and especially there may be difficulties in damping the lower frequency region.

OBJECT AND SUMMARY OF THE INVENTION

Based on this state of the art the invention is based on the task of modifying the known vibration damper in such a way that all frequencies occurring at a motor especially the low-frequency vibrations induced by gas forces can be securely damped.

In accordance with the invention, the problem of the prior art is overcome by a rubber spring device bearing the first flyring which is of rigid design and wherein, the outer flyring is mounted on the inner flyring in rotating fashion.

By this construction according to the invention it is possible to conduct the outer flyring exactly on the inner flyring which is situated in a stable way by the rubber spring device being of rigid design.

The turning of mass is absolutely free. Therefore the outer flyring can be equipped with a bigger mass without any problem. As a result of its design features, the torsional vibration damper according to the invention is in a position to cover the range of vibrations induced by gas forces as well, meaning that all vibrations generated in the engine can be damped at the crankshaft. Thus, the vibrations are controlled directly at the point of origin.

The equipment of a second aggregate for damping the low-freqency vibrations therefore is unnecessary. The torsional damper according to the invention is not only of simple structure, but also has the effect of preventing transmission from the outset of low-frequency vibrations to the downstream units in the system.

Preferably between the outer flyring and the inner flyring in the bearing area a sliding bush is located. Therefore the mobility of the outer flyring on the inner flyring is limited.

To ensure a good vibration damping at motors where the low-frequent vibrations dominate, the outer flyring should preferably have a greater mass moment of inertia than the inner flyring.

Furthermore the rubber spring device bearing the second flyring can be of flexible design to hold the vibration efficiency of this outer flyring and to maintain a secure vibrational damping.

In order to make the rubber spring device bearing the outer flyring especially flexible, this rubber spring device may have multiple breaks at regular intervals in the peripheral direction.

The torsional vibration damper according to the invention can be designed in such a way that the two flyrings sit directly on the hub via their rubber spring devices, i.e. are connected in parallel. In this case, the outer flyring can be secured via its rubber spring device to a radially projecting flange of the hub.

As an alternative, however, it is also possible to provide for series connection of the flyrings in that the outer flyring is secured via its rubber spring device to the outer area of the inner flyring.

The rubber spring device bearing the outer flyring preferably consists of a bonded elastomer with a low modulus of shear.

The inner flyring is preferably connected to the hub via an all-round, continuous rubber layer.

The rubber spring device bearing the inner flyring preferably consists of a non-bonded, pretensioned elastomer with a high modulus of shear.

So that the relatively large outer flyring can be guided accurately, it is expediently mounted on the inner flyring in rotating fashion. A sliding bush can be located between the outer and inner flyring in the bearing area.

The hub expediently consists of a lightweight material, such as aluminium or plastic, and has an integrally moulded part made of steel, grey cast iron or sheet metal for mounting on the crankshaft.

In addition, the side of the hub facing away from the flyrings may have an axial flange which is designed as a V-belt pulley or fitted with an attached V-belt-pulley.

BRIEF DESCRIPTION OF THE DRAWINGS

An example of the invention is illustrated in the drawings and described in detail below on the basis of the drawings. The drawings show the following.

BRIEF DESCRIPTION OF THE PREFERRED EMBODIMENT(S) OF THE INVENTION

Figure 1:
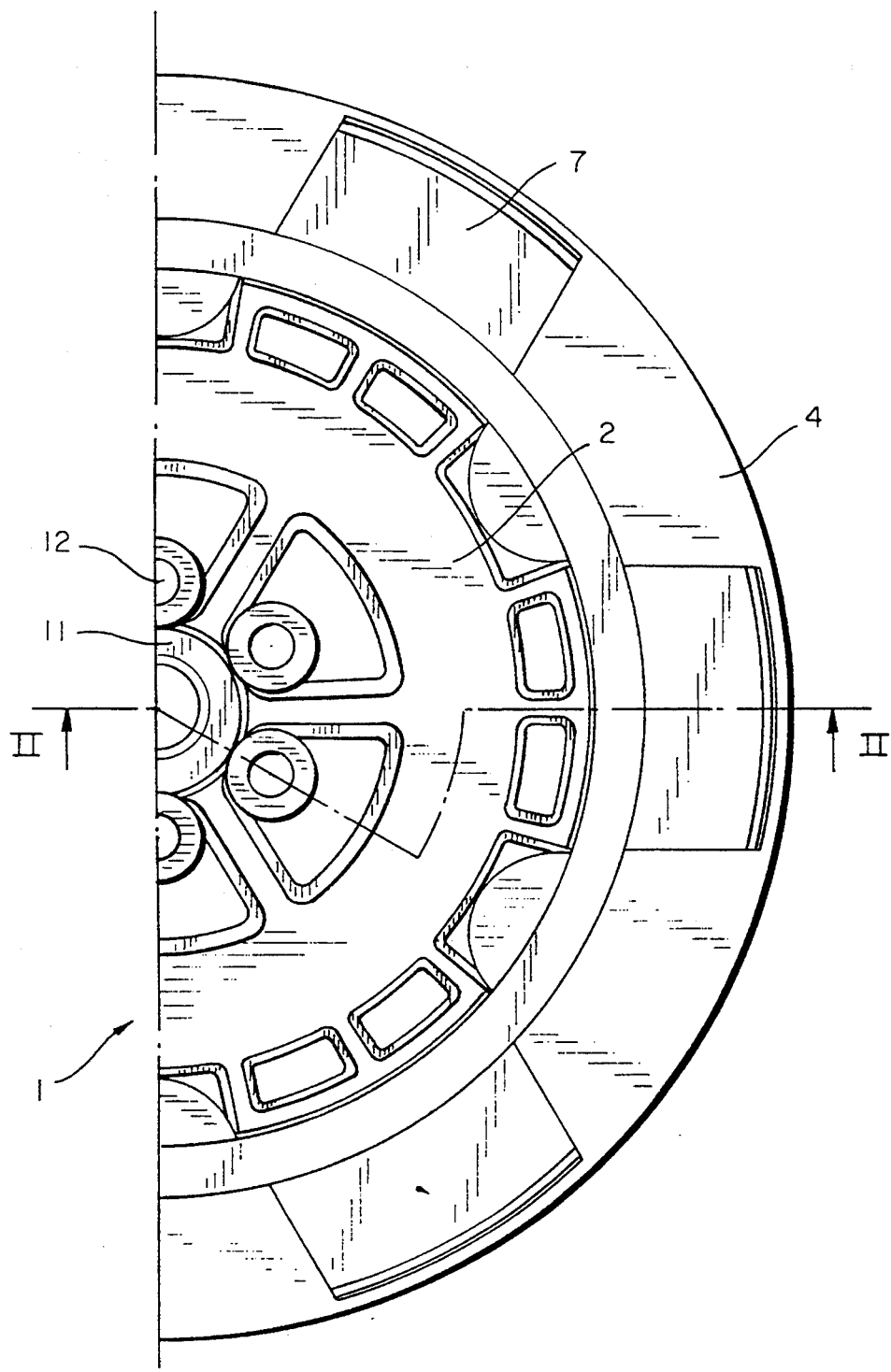
FIG. 1: A view of one half of a torsional vibration damper.
Figure 2:
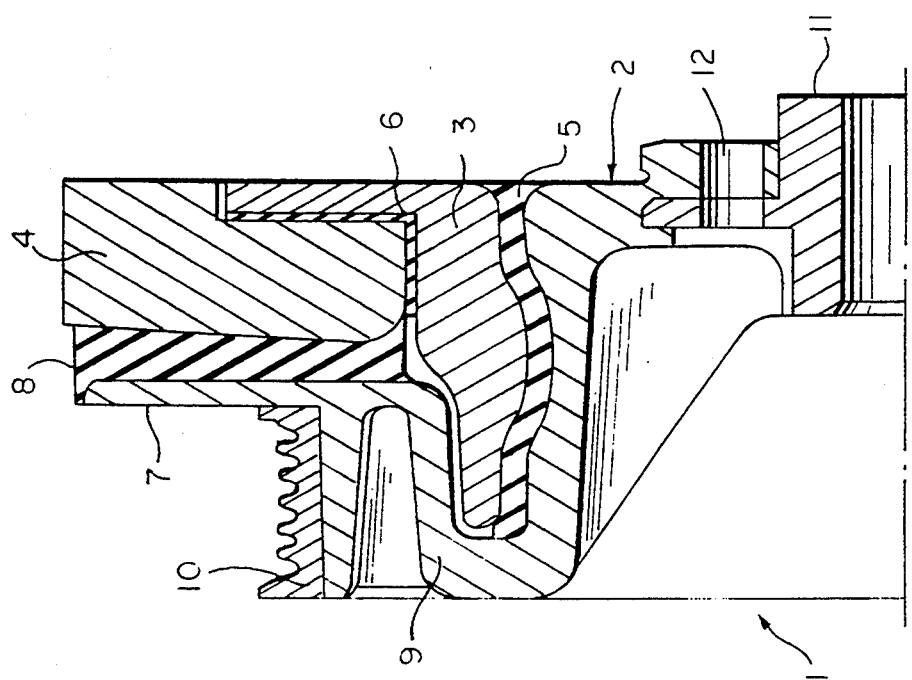
FIG. 2: A section along line II—II in FIG. 1.

According to FIGS. 1 and 2 in the drawings, torsional vibration damper 1 comprises a hub 2, an inner flyring 3 and an outer flyring 4.

Inner flyring 3 is connected to the outer surface of hub 2 via rigid rubber spring device 5 which acts in the peripheral direction.

Rubber spring device 5, which bears inner flyring 3, is made of a non-bonded, pretensioned elastomer with a high modulus of shear.

Outer flyring 4 has a greater mass moment of inertia than inner flyring 3 and is directly mounted in rotating fashion on an outer peripheral surface of inner flyring 3 via sliding bush 6.

Hub 2 is provided with a radially projecting flange 7, by which outer flyring 4 is connected via a flexible rubber spring device 8 which acts in the peripheral direction. Rubber spring device 8 has multiple breaks at regular intervals in the peripheral direction and consists of a bonded elastomer with a low modulus of shear.

Radial flange 7 of hub 2, which bears outer flyring 4, has an axial flange 9 on the side facing away from flyrings 3 and 4, this flange being fitted with an attached V-belt pulley 10.

Hub 2 consists of lightweight material, such as aluminium or plastic. For mounting the hub on a crankshaft not shown in the drawing, the hub is provided with an integral casting 11 made of harder material, such as cast steel or grey cast iron.

For mounting torsional vibration absorber 1 on the crankshaft, the hub is provided with axial bores 12, spaced at equal angles, which pass both through the material of hub 2 and through integral casting 11. Screws are inserted through axial bores 12 and screwed into threaded bores in a radial flange located on the crankshaft.

Figure 3:
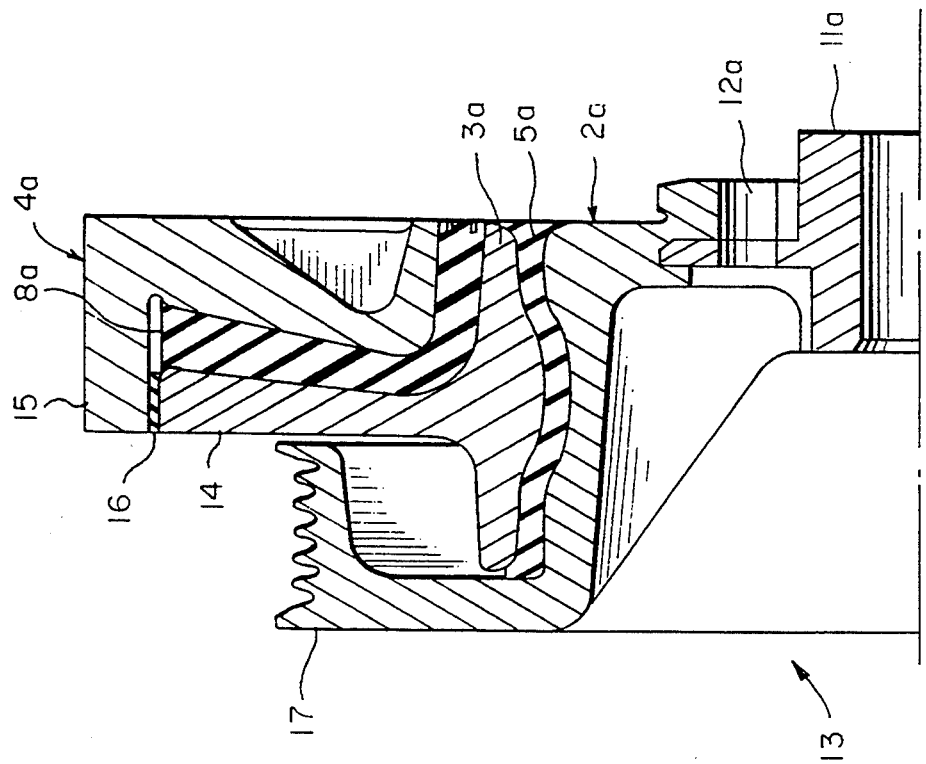
FIG. 3: A section, similar to FIG. 2, through another practical example of a torsional vibration damper.

In the practical example shown in FIG. 3, torsional vibration damper 13 has approximately the same outside dimensions as torsional vibration damper 1, shown in FIGS. 1 and 2.

In contrast to the practical example shown in FIGS. 1 and 2, outer flyring 4a of torsional vibration damper 13 is not located on a flange of hub 2a; instead, its rubber spring device 8a is secured to the outer area of inner flyring 3a.

Inner flyring 3a is provided with a radial flange 14, on the outer peripheral surface of which the inner side of an axial flange 15 of outer flyring 4a is borne via a sliding bush 16.

As in the practical example shown in FIGS. 1 and 2, rubber spring device 8, which bears outer flyring 4, is made of a bonded elastomer with low modulus of shear. Rubber spring device 8a, which may have multiple breaks at regular intervals, adheres both to the inner surface of outer flyring 4a and to the outer periphery of inner flyring 3a and to the facing side of radial flange 14 on inner flyring 3a.

In this practical example, hub 2a again consists of a lightweight material with an integral casting 11a for mounting on a crankshaft not shown in the drawing.

In this practical example, hub 2 is provided with an integrally moulded, one-piece V-belt pulley 17.

I claim:

1. Torsional vibration damper for for motor vehicle engines, with a hub which is adapted to be mounted in a torsionally resistant manner on a crankshaft of the engine, a first flyring which concentrically surrounds the hub and is connected to the outer surface of the hub via a first rubber spring device in a peripheral direction, a second flyring concentrically and directly slidably mounted on an outside of the first flyring, said second flyring being heavier than said first flyring, said second flyring concentrically surrounding the hub and secured to the hub via a second rubber spring device, in a peripheral direction, wherein the first rubber spring device (5) has a modulus of shear different from that of the second rubber spring device (8), the second flyring (4) being mounted on the first flyring (3) so that the first flyring and the second flyring usually rotate together with the hub while being capable of movement relative to each other.

2. Torsional vibration damper according to claim 1, wherein a sliding bush (6; 16) is located in a bearing area between the second flyring (4) and the first flyring (3).

3. Torsional vibration damper according to claim 2, wherein the second flyring (4) has a greater mass moment of inertia that the first flyring (3).

4. Torsional vibration damper according to claim 3, the second rubber spring device (8) has a lower modulus of shear than the first rubber spring device (5).

5. Torsional vibration damper according to claim 4, the second rubber spring device (8) is composed of a plurality of rubber elements equiangularly spaced around the circumference of the flyring (4).

6. Torsional vibration damper according to claim 5, wherein the second flyring (4) is secured via the second rubber spring device (8) to a radially projecting flange (7) of the hub (2) and to an outer area of the first flyring (3).

7. Torsional vibration damper according to claim 6, the second rubber spring device (8) is made of bonded elastomer with a lower modulus of shear than the first rubber spring device (5).

8. Torsional vibration damper according to claim 7, wherein the first flyring (3) is connected to the hub (2) via a continuous annular layer.

9. Torsional vibration damper according to claim 8, wherein the first rubber spring device (5) bearing the inner flyring (3) is made of non-bonded, pretensioned elastomer with a higher modulus of shear than the second rubber spring device (8).

10. Torsional vibration damper according to claim 1, wherein the second flyring (4) has a greater mass moment of inertia than the first flyring (3).

11. Torsional vibration damper according to claim 1, wherein the hub (2) comprises an outer part made of a lightweight material and an integral moulded inner part (11) made of steel, grey cast iron or sheet metal for mounting on a crankshaft.

12. Torsional vibration damper according to claim 1, wherein a side of the hub (2) facing away from the first flyring and the second flyring (3, 4) has an axial flange which is designed as a V-belt pulley (17) or is fitted with an attached V-belt pulley (10).

13. Torsional vibration damper according to claim 1 wherein the second rubber spring device (8) has a lower modulus of shear than the first rubber spring device (5).

14. Torsional vibration damper according to claim 13, wherein the second rubber spring device (8) is composed of a plurality of rubber elements equiangularly spaced around the circumference of the second flyring (4).

15. Torsional vibration damper according to claim 1, wherein the second flyring (4) is secured via the second rubber spring device (8) to a radially projecting flange (7) of the hub (2).

16. Torsional vibration damper in according to claim 1, wherein the second flyring (4) is secured to the hub via the second rubber spring device (8) being engaged on an outer area of the first flyring (3).

17. Torsional vibration damper according to claim 1, wherein the second rubber spring device (8) is made of a bonded elastomer with a low modulus of shear.

18. Torsional vibration damper according to claim 1, wherein the first inner flyring (3) is connected to the hub (2) via a continuous annular layer.

19. Torsional vibration damper according to claim 1 wherein the first rubber spring device (5) is made of a non-bonded, pretensioned elastomer with a modulus of shear higher than that of the second rubber spring device (8).

20. Torsional vibration damper for motor vehicle engines, with a hub which is adapted to be mounted in a torsionally resistant manner on a crankshaft of the engine, a first flyring which concentrically surrounds the hub and is connected to the outer surface of the hub via a first rubber spring device in a peripheral direction, a second flyring concentrically and directly slidably mounted on an outside of the first flyring, said second flyring being heavier than said first flyring, said second flyring concentrically surrounding the hub and secured to the hub via a second rubber spring device in a peripheral direction, wherein the first rubber spring device (5) has a modulus of shear different from the second rubber spring device (8), the second flyring (4) being mounted on the first flyring (3) so as to usually rotate together with the hub while being capable of movement relative to each other, wherein the second flyring (4) has a greater mass moment of inertia than the first flyring (3), and wherein the second rubber spring device (8) bearing the second flyring (4) has a low modulus of shear.

21. Torsional vibration damper according to claim 20, wherein the hub (2) comprises an outer part made of a lightweight material an integrally moulded inner part (11) made of steel grey cast iron or sheet metal for mounting on a crankshaft.

* * * * *